Figure 1:
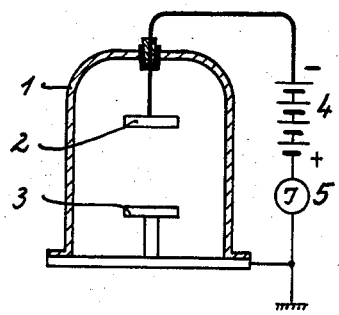

Sept. 29, 1959     H. NAGORSEN ET AL     2,906,002
PROCESS FOR PRODUCING SELENIUM RECTIFIER PLATES
Filed March 26, 1956     2 Sheets-Sheet 1

Inventors:
Hans Nagorsen
&
Hans Schweickert 2,906,002

PROCESS FOR PRODUCING SELENIUM RECTIFIER PLATES

Hans Nagorsen, Berlin-Siemensstadt, and Hans Schweickert, Pretzfeld Oberfranken, Germany, assignors to Siemens-Schuckertwerke Aktiengesellschaft, Berlin and Erlangen, Germany, a German joint stock company Application March 26, 1956, Serial No. 573,894

3 Claims. (Cl. 29—25.3)

Our invention relates to a process for producing selenium rectifier plates.

In the manufacture of selenium rectifier plates it is known to use agents promoting the formation of a blocking layer and to either treat the surface of the semi-conductive selenium directly with such agent or to incorporate such agent in the cover electrode permitting it by suitable treatment to act on the semi-conductive layer. More particularly, it has been proposed, for instance, to provide the semi-conductive layer by the deposition of vapors directly with a coat of an agent promoting the formation of a blocking layer, agents of this kind being thallium, indium or gallium, or an alloy thereof, the coat thus produced forming an intermediary layer to which a special cover electrode is applied. In producing such a coat or intermediary layer, care must be taken to ensure that it will have the required thickness and uniformity and will be free from irregularities. More particularly, it is a requirement that the agent, such as thallium, be uniformly distributed over the area of the surface of the semi-conductor, and that the total quantity of the agent be accurately determined thus reducing or completely precluding a subsequent aging of the rectifier that could be caused by a continued diffusion of the agent into the semi-conductor.

It is the object of the present invention to provide an improved process for producing a dry rectifier plate of selenium whereby the plate is provided with a coat of uniform thickness of an agent promoting the formation of the blocking layer to thereby ensure that all surface units of the area of the semi-conductive selenium plate will be provided with the same quantity of the agent.

Considerable difficulties have been encountered in attaining this object by the deposition of vapors of the agent where a large surface is to be coated therewith. These difficulties are due to the fact that where a lump of the agent is heated to vaporize the same, films of oxide are formed on the surface of the lump, such films being liable to break during the vaporizing process at points distributed irregularly thus causing an irregular distribution of the vapors over the entire surface of the lump resulting in an irregular deposition of the vapors on the surface to be coated. It is extremely difficult to prevent the formation of such films of oxide. As the vaporization by heat requires a high vacuum, care must be taken during the vaporizing process to maintain such vacuum at the required degree. Moreover, it is necessary in the vaporizing process to maintain a comparatively large distance between the lumps of agent to be vaporized and the surface to be coated by the condensed vapors in order to preserve the semi-conductive layer to be coated from damage.

We have found that the difficulties encountered in coating the selenium layer with an agent promoting the formation of a blocking layer, such as thallium, by the deposition of vapors in a vaporizing process, may be avoided by the use of cathode atomization and deposition to produce the coat of such agent. In this process the quantity of the agent to be deposited may be determined very accurately since the quantity of the agent atomized is practically proportional to the strength and the duration of the discharge current. Also, the process of cathode deposition affords a possibility of altering the quantity of the agent deposited on the selenium plate during the depositing process in accordance with any desired arbitrary characteristic. The cathode atomization results in a uniform distribution of the agent over the entire area to be coated since in this process the ions of the agent are conveyed to the surface to be coated by a sufficiently homogeneous electrical field.

While our preferred novel process permits the coating of the semi-conductive selenium layer or plates directly with the agent above referred to, it is within the purview of our invention to coat a carrier with the agent by cathode deposition, to thereafter place such carrier on the semi-conductive layer, and to then subject the assembly to a suitable treatment involving pressure or heat or both causing the carrier to intimately adhere to the semi-conductive layer. This treatment may comprise heating the assembly to a temperature causing the alloy of which the carrier consists to melt. Alternatively, however, the assembly may be heated to a lower temperature subjecting it at the same time to a pressure of about 5 kilograms per square centimeter. Alternatively, the treatment may comprise subjecting the assembly to a pressure of about 1,000 kilograms per square centimeter at normal temperature whereby both elements will be intimately bonded to each other. The carrier referred to may constitute the cover electrode of the rectifier assembly.

A preferred embodiment of our novel process comprises the consecutive steps of applying a semi-conductive layer to a supporting plate, such layer consisting of selenium of amorphous or partly crystalline nature, coating the semi-conductive layer with the agent above referred to or with a material containing such agent, producing the cover electrode on the coat, and subjecting the assembly to a heat treatment converting the semi-conductive selenium layer in the required manner. The heat treatment may comprise heating the completed assembly for a period of about ten minutes to a temperature of about 218° C. This heat treatment may constitute an initial phase, an intermediary phase or a final phase of an electrical formation process. The heat treatment following the production of the cover electrode may be made use of to cause the agent contained in the intermediary coat to react with the selenium, such reaction resulting in the formation of the blocking layer of the rectifier.

The novel process offers particular advantages where the semi-conductive layer of selenium and the coat of the agent, such as thallium, and, if desired, the layer constituting the cover electrode are applied to the support in the same vacuum vessel. As a result, the sensitive surface of the semi-conductive selenium will be directly protected by the coat of the agent applied thereto, and this coat again will be protected by the layer constituting the cover electrode. It is not absolutely required, however, that both layers be applied to the semiconductive layer in direct succession. Where certain materials are used as the agent promoting the formation of the blocking layer, the layer constituting the cover electrode may be applied to the coat of the agent, if desired, in a separate process which need not necessarily be carried out in vacuum, but may be carried out in a vacuum at another temperature. Thus, the layer constituting the cover electrode may be applied to the coat of the agent by a spraying process at normal atmospheric pressure.

For depositing the atomized agent, such as thallium, by cathode deposition, we may use various methods which have been found particularly efficient. Where large areas are to be coated for manufacturing rectifier plates of selenium we prefer the use of a cathode of a large surface in order to ensure uniformity of the coat and to guarantee deposition of the same quantity of the agent per surface unit. An ideal apparatus for this step would include a cathode having a surface equal to or larger than the surface to be coated. Where the surface to be coated has very large dimensions, however, difficulties may arise in such process, and it is among the objects of the invention to avoid such difficulties by the use of a particularly simple process involving preferably the use of one or a plurality of cathodes having a small surface and involving relative motion at a uniform speed between such cathodes and the surface to be coated. It is desirable, in order to ensure efficiency of the cathode, that the latter should not be heated in operation to a high temperature. This condition may be easily applied where a small cathode is employed, since it may be given a large caloric capacity in a simple manner. Where such caloric capacity by itself would not be sufficient to keep the temperature of the cathode within desirable limits, means may be provided for cooling the cathode, for instance by circulation of a cooling medium, such as oil or water. Alternatively, a cooling effect may be exerted on the cathode by utilization of the melting or vaporization heat of a suitable medium, whereby the temperature of the cathode may be kept constant, such medium being circulated in a suitable manner within a suitable circulating system. Also, a cooling effect may be produced artificially by producing circulation of the cooling medium by convection. The relative motion of the surface to be coated and of the cathode may be any desired motion, such as a purely translatory motion, or an angular motion, or a combination of both. For example, the cathode may rotate relative to the surface to be coated in the manner of rotary blades, while the surface to be coated travels past the cathode.

It is another object of our invention to provide an improved cathode structure for atomizing the agent and a suitable process for producing such cathode structure. Where the selenium layer is to be coated with a blocking layer-promoting agent, such as thallium, a cathode containing the agent may be produced by depositing the agent on a suitable carrier by a sintering process, or by condensation of vapors of the agent, or by depositing the agent by electrolysis, the term "electrolysis" including the electrophoretic deposition. In this process the carrier may be a plate of aluminum or any suitable inorganic material, for instance ceramic material. Alternatively, a layer of the agent may be applied to the support in form of a foil glued to the support, such foil consisting of the agent. In lieu of the pure agent a material containing same may be used.

In the initial phases of the cathode-atomization process foreign matter is liable to be atomized as impurities which may adhere to the surface of the cathode. For this reason, we prefer in our novel process to insert a screen between the surface to be coated and the cathode to be atomized, the atomized material being thus deposited only on the screen, in the initial phase. After a predetermined period of time has elapsed after the commencement of the atomization process, the screen is removed by suitable means. This permits the atomized agent to be deposited on the semi-conductive selenium layer. Preferably, the period of time is determined by a suitable examination of the condition of the atomized agent, for instance by a spectroscopic examination. If desired, however, a receiving compartment or garage may be disposed within the vacuum vessel, and the cathode may be enclosed in this garage during the initial phase of the atomization process. After the initial period, when the matter atomized is of unobjectionable quality, the cathode is moved into operative position for the deposition of the atomized agent. Preferably, an anti-cathode is disposed within the vessel in spaced relationship to the cathode, the distance therefrom being so small that no corona discharge will take place between the cathode and the anti-cathode. By this provision the atomized material may be caused to flow directly to the surface to be coated for deposition thereon.

It has been pointed out hereinabove that the quantity of material deposited by cathode atomization may be metered in a very simple manner by controlling the strength and the duration of the electrical current. The quantity of the material deposited also depends on the degree of the vacuum as the latter has a controlling effect upon the strength of the discharge current. In order to ensure uniformity of the deposition in our process it may be preferable to control the cathode atomization by governing the supply of electrical energy in dependence on the condition of the vacuum. This may be effected, for instance, by the use of a ionization pressure gauge producing a controlling impulse applied to a suitable governing device controlling the supply of the electrical energy. It will be readily understood, however, that alternatively the rate of the deposition may be kept constant or may be varied in accordance with any desired characteristic by the provision of a measuring instrument responsive to a change of the discharge current and operative to vary the degree of vacuum within the vessel thereby influencing the atomization and deposition process accordingly.

Further objects of our invention will appear from a detailed description of a number of preferred embodiments of the present invention with reference to the accompanying drawings. It is to be understood, however, that the terms and phrases used in such description have been chosen for the purpose of illustrating the invention rather than that of restricting or limiting the same.

In the drawings,

Fig. 1 illustrates an apparatus which may be used in carrying out the novel process for producing a rectifier plate, such apparatus including a vacuum vessel shown in section, Fig. 2 is a view, similar to that of Fig. 1, of a modified apparatus in which the plates to be coated are mounted on a rotary support, and Fig. 3 a sectional view of an apparatus in which movement is imparted to the cathode relative to the articles to be coated.

A support 3 provided with the layer of selenium and a cathode 2 are disposed in spaced parallel opposed relationship within a vessel 1 in which a high vacuum is maintained by suitable means not shown. The support 3 may consist of aluminum or steel, whereas the cathode 2 preferably consists of aluminum provided with a layer of a suitable material, such as thallium, adapted to promote the formation of the blocking layer in the rectifier during the formation treatment thereof. In lieu of thallium other substances may be used, such as indium, or gallium, or an alloy of these materials.

The vessel 1 consists of an electrically conductive material and constitutes the anode. The support 3 is electrically connected therewith. A source of current 4 has its negative terminal connected to the cathode 2, whereas its positive terminal is connected to the anode which is preferably grounded. An amperemeter 5 is included in the circuit to indicate the current. The electrical potential produced between the cathode 2 and the selenium layer on support 3 will set up an electrostatic field which causes ions of thallium to wander from the cathode to the selenium layer on support 3 to be deposited thereon.

Satisfactory results will be obtained if the distance between the cathode 2 and the support 3 amounts to from 10 to 100 millimeters, the electrical potential amounting to 1,500 volts, the vacuum in the vessel 1 amounting to $10^{-2}$ mm. mercury and the temperature being the normal temperature. Under these conditions the process will be continued for a period of time, of the order of about 20 minutes, producing a coat of thallium on the selenium layer, such coat having a weight of about $2.10^{-6}$ grams per square centimeter.

Figure 2:
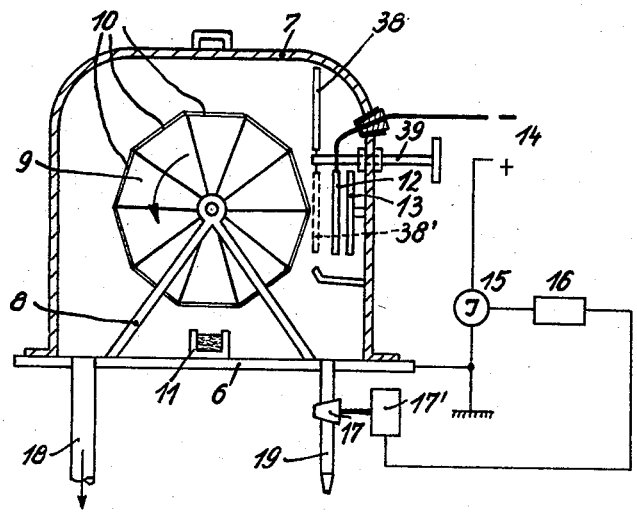

In the apparatus illustrated in Fig. 2 the vessel includes a bottom plate 6 and a bell 7. Within the vessel a bracket 8 is mounted carrying a rotary frame 9 provided with a plurality of plates 10 carrying layers of selenium to be coated with a thin but uniform coat of a suitable agent, such as gallium, adapted to promote the formation of a blocking layer by reaction with an element contained in the cover electrode which is subsequently placed on the coated selenium plate and subjected to a suitable formation including a heat treatment. Preferably, the plates 10 are circumferentially distributed about the horizontal axis of rotation of the frame 9, being equally spaced from such axis. Suitable means, such as an electric motor not shown, are mounted within the vessel to impart a continuous rotation to the frame 9, at a speed of 20 rotations per minute, for instance. Beneath the rotary frame 9, a vaporizer 11 is mounted on the bottom plate 6, such vaporizer being a crucible containing a semi-conductor, such as selenium. The crucible is heated by suitable means, for instance by an electrical heater not shown, to a temperature of about 350° C. causing the selenium to vaporize. The vapors rise and will be condensed and deposited on the plates 10 of aluminum to form the selenium layer thereon. The distance between the frame 9 and the level of selenium in the crucible 11 may amount to 20 millimeters, for example. The cathode atomization means is mounted on a side wall of the bell, such means comprising the cathode 12 and an anti-cathode 13. Both are vertical plates disposed in parallel spaced relationship. Both plates may consist of aluminum and their distance may amount to 5 millimeters. The bottom plate 6, the brackets 8, the frame 9, the plates 10, and the bell 7 consist of a conductive material and are electrically connected to one another and are grounded. The cathode 12 is connected to the negative terminal of a source of current 14, whereas the positive terminal thereof is grounded.

The cathode 12 may consist of a plate of aluminum provided with a coat of a suitable agent promoting the formation of a blocking layer by reaction with an element contained in the cover electrode which is later applied to the coated selenium layer, such reaction occurring during the subsequent heat treatment to which the rectifier will be subjected. A suitable agent is thallium. However, indium, gallium, silver, alkali metals, earth alkali metals, such as magnesium, and the rare earths, such as cerium, may be used as agents promoting the formation of a blocking layer. A pipe 18 connects the vessel to the suction port of a pump creating a high vacuum in the vessel. A second pipe 19 in which a valve 17 is inserted connects the vessel to a source of a suitable gas, such as nitrogen, hydrogen, or air. The electrostatic field set up by the electrical potential between the cathode 12 and the opposed plates 10 causes a stream of ions of the agent to flow from the cathode 12 to the opposed plates 10 to be deposited on the selenium layer thereof. The strength of this discharge current is measured by an amperemeter 15. This amperemeter is connected with a suitable governor 16 adapted to control a setting motor 17' which adjusts the valve 17 so as to maintain a vacuum in the vessel, which permits the required current to flow.

This control system operates as follows: Should the discharge current drop below the desired limit the amperemeter 15 will respond to such drop of current and will cause the governor 16 to put the setting motor 17' into a valve-closing operation. Due to the closing of the valve 17 the vacuum in the vessel will be intensified and this will increase the discharge current. The operation described is carried out at normal temperature. Satisfactory results have been obtained with a discharge current amounting to 1 milliampere per square centimeter of the surface of the cathode 12. The governor 16 may be adjusted to vary the characteristic of the current. Thus, satisfactory results have been obtained by gradually reducing the discharge current, to thereby reduce the rate of the deposition of the agent on the selenium layer as the process proceeds. This method will result in a lower temperature of the cathode than the temperature that would result from a uniform rate of deposition.

In an alternative method that may be carried out by means of the apparatus shown in Fig. 2, the plates 10, described above as having a layer of selenium, are replaced by plates consisting of an alloy of tin, cadmium and bismuth. After these plates have been coated with the agent promoting the formation of a blocking layer they are placed on a supporting plate of iron, or aluminum, or another suitable metal, which is provided with a layer of selenium. The selenium is thus brought into contact with the coat of the agent deposited on the alloy plates. It has been metioned that a screen may be interposed between the cathode and the plates 10 to be coated. For this purpose, a horizontal shaft 39 extends through the wall of the bell 7. Its outer end is provided with knob for manual manipulation, whereas its inner end carries a plate 38 constituting a screen, which by turning the shaft 39 may be interposed between the cathode 12 and the frame 9 carrying the plates 10 to be coated. When the atomization process commences the screen is moved to the position 38'. Then the cathode 12 is subjected to the full voltage for a period of about 20 seconds thus producing a discharge current of the order of about 1 milliampere per square centimeter cathode surface. If desired, the purity of the atomized agent may then be examined by a spectroscopic method. Should it be found that the agent has the required degree of purity the operator will turn the shaft 39 to move the screen blade to the position 38 shown in full lines so that the path of ions from the cathode 12 to the opposed plate 10 will be no longer obstructed by the screen.

Figure 3:
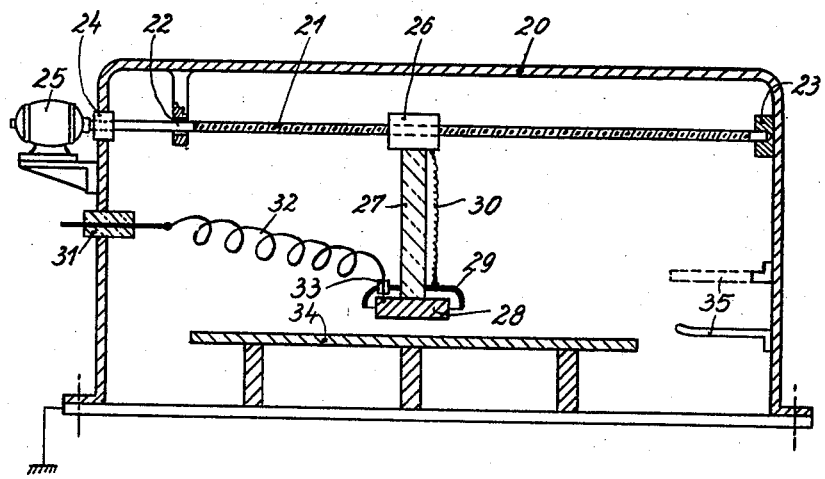

In Fig. 3 an apparatus is illustrated in which movement is imparted to the cathode. A threaded spindle 21 extends horizontally through the interior of a vacuum vessel 20, such spindle being mounted for rotation in brackets 22 and 23. The spindle extends through a packing 24 inserted in an aperture of the bell 20 and is connected to an electric motor 25 mounted on a bracket fixed to the outside of the bell 20. A nut 26 is mounted for travel on the spindle 21, such nut carrying the cathode 28. For that purpose, a body 27 of insulating material is suspended from the nut 26 and its lower end is fixed to the cathode 28. Above the cathode 28 and slightly spaced therefrom there is mounted a dish-shaped conductive plate 29 constituting the anti-cathode which is grounded via a wire 30, the nut 26, the spindle 21, and the vessel 20 which consists of an electrically conductive material and is grounded. The cathode 28 is connected to the negative terminal of a source of current having a voltage of about 1,500 volts, such connection being effected by a flexible cable 32 and a conductor extending through a lead-through insulator 31 inserted in the wall of the bell 20. A supporting plate 34 which is electrically connected with the base plate and is thereby grounded, carries the selenium-plated rectifier plates which are to be coated with the agent, such as thallium, promoting the formation of a blocking layer, the cathode 28 being provided with a layer of such agent. The cathode 28 and the supporting plate 34 have equal widths measured perpendicularly to the plane of the drawing.

In its starting position the cathode 28 is encased in a garage 35 which is formed by a bottom plate fixed to the side wall of the bell 20 and by a ceiling plate fixed to the same wall thereabove, such ceiling plate being provided with a longitudinal slot through which the insulating member 27 may travel. The support 34 is substantially shorter than the bell 20 being spaced from the right hand side wall of the bell 20 a distance substantially exceeding the length of the garage 35. While the cathode is still encased in the garage, the potential is applied thereto. After a period of about 20 seconds the purity of the agent atomized may be examined by a spectroscopic method, and should it be found that the purity complies with the requirements, the motor 25 is started causing the cathode to travel at a uniform speed towards the left moving the cathode 28 above and past the selenium layers to be coated. A single travel of the cathode from the right to the left may result in a sufficient deposition of the agent on the selenium layer. If desired, however, the cathode may be caused to travel a plurality of times past the selenium layers by automatic reversal of the electric motor 25. The temperature of the cathode 28 may rise to about 150° C. The caloric capacity of the cathode may preferably amount to 1 kilocalorie per 1° C. For this purpose, the cathode consisting of aluminum may have a weight of about 5 kilograms.

Where it is desired to apply the layer constituting the cover electrode to the rectifier assembly in the same apparatus in which the coat of the agent is applied, the vessel, such as the vessel 7 in Fig. 2, may be provided with a second crucible containing a suitable substance for the cover electrode. When this crucible is heated, the substance therein will vaporize and the vapors will be deposited on the selenium layers which have been previously coated with the thallium or other suitable agent.

While the invention has been described in connection with a number of preferred embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In the manufacture of a rectifier comprising a base electrode, a layer of selenium thereon, a conductive layer constituting a cover electrode comprised of a cadmium containing alloy, and of a subsequently formed blocking layer between said layers, the process comprising the steps of mounting one of the two first-mentioned layers in opposed spaced relationship to a cathode having a surface incorporating an agent, taken from the group consisting of thallium, indium, and gallium and alloys thereof, adapted to promote the formation of said blocking layer, producing a vacuum and applying a relative electrical potential between said cathode and said layer opposed thereto thereby causing ions of said agent to travel from said cathode to said opposed layer to be deposited thereon in form of a thin uniform coat, said cathode having previously been subjected to a period of application of electrical potential, under vacuum, during which period foreign impurities are vaporized from its surface and during which the said impurities are prevented from travelling to said opposed layer, covering said layer of selenium with said cover electrode, with said coat therebetween, and subjecting the assembly so formed to a heat treatment causing said layers to be bonded to each other and to react with said coat and with each other to form said blocking layer, the degree of vacuum and the duration of the period of deposition being controlled to accurately determine the total quantity of the agent deposited, said quantity being limited to substantially preclude continued diffusion of the agent into the selenium after the formation of the blocking layer, during use of the rectifier.

2. In the manufacture of a rectifier comprising a base electrode, a layer of selenium thereon, a conductive layer constituting a cover electrode comprised of a cadmium containing alloy, and of a subsequently formed blocking layer between said layers, the process comprising the steps of mounting one of the two first-mentioned layers in opposed spaced relationship to a cathode having a surface incorporating an agent, taken from the group consisting of thallium, indium, and gallium and alloys thereof, adapted to promote the formation of said blocking layer, producing a vacuum and applying a relative electrical potential between said cathode and said layer opposed thereto thereby causing ions of said agent to travel from said cathode to said opposed layer to be deposited thereon in form of a thin uniform coat, the opposed cathode surface having an area only a minor fraction of the layer opposed thereto, the cathode and layer being moved relative to each other at a substantially uniform rate, said cathode having previously been subjected to a period of application of electrical potential, under vacuum, during which period foreign impurities are vaporized from its surface and during which the said impurities are prevented from travelling to said opposed layer, covering said layer of selenium with said cover electrode, with said coat therebetween, and subjecting the assembly so formed to a heat treatment causing said layers to be bonded to each other and to react with said coat and with each other to form said blocking layer, the degree of vacuum and the duration of the period of deposition being controlled to accurately determine the total quantity of the agent deposited, said quantity being limited to substantially preclude continued diffusion of the agent into the selenium after the formation of the blocking layer, during use of the rectifier.

3. In the manufacture of a rectifier composed of a base electrode, a layer of selenium thereon, a conductive layer constituting a cover electrode, and of a blocking layer between said layers, the process comprising the steps of mounting one of the two first-mentioned layers in opposed spaced relationship to a cathode having a surface incorporating an agent adapted to promote the formation of said blocking layer, conducting a cooling medium in contact with said cathode, producing a vacuum and applying a relative electrical potential between said cathode and said layer opposed thereto thereby causing ions of said agent to travel from said cathode to said opposed layer to be deposited thereon in form of a thin uniform coat, putting said cover electrode on said layer of selenium, with said coat therebetween, and subjecting the assembly so formed to a heat treatment causing said selenium layer to react with said coat and with the cover electrode to form said blocking layer, the total quantity of the agent deposited being limited to substantially preclude continued diffusion of the agent into the selenium after the formation of the blocking layer, during use of the rectifier.

References Cited in the file of this patent

UNITED STATES PATENTS 2,718,688    Waldkotter _____ Sept. 27, 1955

FOREIGN PATENTS 620,405    Great Britain _____ Mar. 24, 1949
639,381    Great Britain _____ June 28, 1950
721,109    Great Britain _____ Dec. 29, 1954